United States Patent
Nagare

(10) Patent No.: US 9,339,891 B2
(45) Date of Patent: May 17, 2016

(54) LIQUID PHASE LASER ABLATION METHOD AND APPARATUS

(75) Inventor: Sanshiro Nagare, Ohta-ku (JP)

(73) Assignee: NARA MACHINERY CO., LTD., Tokyo (JP)

( * ) Notice: Subject to any disclaimer, the term of this patent is extended or adjusted under 35 U.S.C. 154(b) by 167 days.

(21) Appl. No.: 14/000,721

(22) PCT Filed: Feb. 13, 2012

(86) PCT No.: PCT/JP2012/053285
§ 371 (c)(1),
(2), (4) Date: Aug. 21, 2013

(87) PCT Pub. No.: WO2012/114923
PCT Pub. Date: Aug. 30, 2012

(65) Prior Publication Data
US 2013/0320595 A1 Dec. 5, 2013

(30) Foreign Application Priority Data
Feb. 21, 2011 (JP) .................. 2011-035060

(51) Int. Cl.
*B23K 26/122* (2014.01)
*B82Y 40/00* (2011.01)
(Continued)

(52) U.S. Cl.
CPC .............. *B23K 26/122* (2013.01); *B23K 26/16* (2013.01); *B23K 26/362* (2013.01); *B29C 59/16* (2013.01); *B82Y 40/00* (2013.01); *B29C 2035/0838* (2013.01)

(58) Field of Classification Search
USPC .................. 425/174.4; 264/400, 482; 241/16
See application file for complete search history.

(56) References Cited

U.S. PATENT DOCUMENTS

| 6,700,660 B2 * | 3/2004 | Sabsabi | G01N 21/15 |
| | | | 250/432 R |
| 6,720,522 B2 * | 4/2004 | Ikegami | B23K 26/0732 |
| | | | 219/121.69 |

(Continued)

FOREIGN PATENT DOCUMENTS

| JP | 6 142971 | 5/1994 |
| JP | 2002 224878 | 8/2002 |

(Continued)

OTHER PUBLICATIONS

English translation of the International Preliminary Report on Patentability and Written Opinion issued Aug. 21, 2013 in PCT/JP2012/053285 filed on Feb. 13, 2012.

(Continued)

*Primary Examiner* — Atul P. Khare
(74) *Attorney, Agent, or Firm* — Oblon, McClelland, Maier & Neustadt, L.L.P.

(57) ABSTRACT

A liquid phase laser ablation apparatus is provided, which includes a vessel for storing liquid in which a component to be atomized is arranged; a laser oscillating device for oscillating a laser light irradiated to the component through the liquid; a reflecting mirror configured to freely change an angle of incidence of the laser light with respect to a surface of the liquid; a focusing lens for focusing the laser light oscillated from the laser oscillating device; a cover body for covering an upper surface of the vessel; and a laser light introduction port provided on the cover body or a side surface of the vessel above the surface of the liquid. Accordingly, liquid will not adhere to optical components constituting the apparatus, there is little contamination and damage to the optical components, and laser ablation can occur in a continuous and stable manner for a long period of time.

13 Claims, 4 Drawing Sheets

(51) Int. Cl.
  *B23K 26/12* (2014.01)
  *B29C 59/16* (2006.01)
  *B23K 26/16* (2006.01)
  *B23K 26/36* (2014.01)
  *B29C 35/08* (2006.01)

(56) References Cited

U.S. PATENT DOCUMENTS

| | | | | |
|---|---|---|---|---|
| 8,246,714 B2 * | 8/2012 | Liu | .................... | B01J 13/0043 |
| | | | | 204/157.15 |
| 8,858,676 B2 * | 10/2014 | Liu | .................... | B01J 19/121 |
| | | | | 204/157.41 |
| 8,992,815 B2 * | 3/2015 | Hu | .................... | B01J 13/0086 |
| | | | | 241/1 |
| 2002/0050489 A1 | 5/2002 | Ikegami et al. | | |

FOREIGN PATENT DOCUMENTS

| | | | |
|---|---|---|---|
| JP | 2004090081 A | * | 3/2004 |
| JP | 2006122845 A | * | 5/2006 |
| JP | 2007 70141 | | 3/2007 |
| WO | WO 2010/087869 A1 | | 8/2010 |
| WO | WO 2011/100152 A1 | | 8/2011 |
| WO | WO 2011/100154 A1 | | 8/2011 |

OTHER PUBLICATIONS

Office Action issued Dec. 10, 2013 in Japanese Patent Application No. 2011-035060.
International Search Report Issued Mar. 19, 2012 in PCT/JP12/053285 Filed Feb. 13, 2012.

* cited by examiner

LIQUID PHASE LASER ABLATION METHOD AND APPARATUS

TECHNICAL FIELD

The present invention relates to a liquid phase laser ablation method and apparatus for performing ablation of a component to be atomized by using pulsed laser light (irradiation) in the liquid phase, and generating atomized fine particles having diameter of a nanometer order. In particular, the present invention relates to a liquid phase laser ablation method and liquid phase laser ablation apparatus in which a liquid does not adhere to optical components or the like constituting the laser ablation apparatus, so that attrition and damage of the optical components can be reduced, and the laser ablation operation can be continuously and stably continued over a long period of time.

BACKGROUND ART

As a conventional method comprising the steps of: irradiating the pulse laser light (pulsed laser irradiation) to a compact body composed of various powders; releasing particles as finely atomized component thereby to generate fine particles having a particle diameter of nanometer order, such a conventional method has been mainly performed in a gaseous phase under pressure-reduced condition such as in a vacuum vessel.

In comparison with the above conventional gaseous phase laser ablation method, there has been eagerly developed and advanced the liquid phase laser ablation method in which the ablation operation is performed in the liquid phase in view of the following advantageous points:
a) an amount of scatter of the nanoparticles is small, and all of the generated nanoparticles can be utilized as a product;
b) a highly-cost vacuum equipment is not necessary, a structure of the equipment or facility therefor can be simplified and a facility cost is low;
c) a particle size distribution of the generated nanoparticles is sharp, and a scattering (variation) in the particle size is small;
d) the generated nanoparticles do not contact ambient air, so that impurities are not mixed into the nanoparticles as the product, so that the nanoparticles having high purity can be obtained;
e) the generated nanoparticles cause less agglomeration in the liquid phase than in the gaseous phase, and the nanoparticles can be taken out in a state where the nanoparticles are uniformly dispersed in the liquid phase; and the like.

FIG. 8 shows an example of a structure of the conventional liquid phase laser ablation apparatus disclosed in Japanese Patent Application (Laid-Open) Publication No. 2004-90081 (Patent Document 1). A laser light L oscillated from the laser oscillation device 21 is reflected by a reflecting mirror 22 toward a direction of a liquid 24, and vertically enters in a liquid surface.

Namely, the above-mentioned liquid phase laser ablation apparatus disclosed in the above Patent Document discloses a method comprising steps of: immersing a target 32 in the liquid 24 stored in a vessel (cell), the target 32 containing a component to be atomized; irradiating a laser light L which is focused by a focusing lens (collecting lens) 23 onto a surface of the target 32 from upward direction, and generating nanoparticles of, for example, metal, oxide, organic compounds, or the like that constitute the target 32.

Moreover, FIG. 7 shows another example of a structure of the conventional liquid phase laser ablation apparatus disclosed in Japanese Patent Application (Laid-Open) Publication No. 2006-122845 (Patent Document 2).

Namely, the above-mentioned Patent Document 2 discloses a liquid phase laser ablation apparatus in which a penetration hole 16 is provided to a side wall of the vessel 11 composed of glass with which the liquid 24 is filled, and a laser light introduction window (window body) 14 is fitted in the penetration hole 16.

The target 32 is immersed in the liquid 24 stored in the vessel 11. The laser light L which is oscillated in a horizontal direction form the laser oscillating device 21 is focused (converged) by the focusing lens 23 so that a focus of the laser light L is formed on a surface of the target 32. Thereafter, the focused laser light L is irradiated in a horizontal direction to the target 32 through the laser light introduction window 14. As a result, the component of the target 32 is generated as finely atomized particles having a form of atom, molecule, ion, or cluster-shape.

PRIOR ART DOCUMENTS

Patent Document

[Patent Document 1] Japanese Patent Application (Laid-Open) No. 2004-090081.
[Patent Document 2] Japanese Patent Application (Laid-Open) No. 2006-122845.

SUMMARY OF INVENTION

Problems to be Solved by the Invention

However, in the conventional liquid phase laser ablation apparatus disclosed in the above-mentioned patent document 1, due to an impact force generated at a time when the laser light is incident into a liquid surface, "liquid rebounding phenomenon" occurs from a liquid surface portion at which the laser light is incident, as the same manner as in a case as if a stone is thrown off on a water surface and the water is rebounded. As a result of "the rebounding phenomenon of the liquid", droplets would scatter or splash to an upper part of the incident point and its circumference, so that there may be arisen a problem such that circumference equipment or facilities are damaged or defiled.

Although the amount of scattering (rebounding) of these droplets changes in accordance with output power of the laser light, the scattering of the droplets generally occurs within a range from the liquid surface to a portion 20-30 cm apart from the liquid surface. When these rebounded liquid are adhered to optical components such as the focusing lens, a reflection mirror or the like, absorption, scattering (dispersion), and reflection of the laser light will occur at the adhered portion, so that the optical components are damaged, and the adhered portion will partially ground (peeled off) thereby to generate fine components of the optical components, then the generated fine components are disadvantageously mixed into the liquid thereby to cause a contamination of the liquid. As a result, impurities are mixed into a group of nanoparticles as a product, so that there may arise a greater risk such that the purity of the product is lowered or the like.

Moreover, due to the damage or defilement of the optical components, irradiating conditions of the laser light cannot be kept constant and the conditions are unstably changed, so that there may be posed problems such that the laser light cannot be stably irradiated to the target for a long period of time, and an operation control for the laser ablation apparatus becomes to be complicated.

On the other hand, in the conventional liquid phase laser ablation apparatus indicated in the Patent Document 2, the apparatus is not a system for irradiating the laser light to the liquid surface, the phenomenon of "rebound of liquid" would not occur. However, even if the window body (laser light introduction window) is formed from material such as quartz glass, calcium fluoride or the like having a high transmittance with respect to the laser light, the absorption, scattering (dispersion), and reflection of the laser light will occur at a portion (interface) at which the window body contacts the liquid contained in the vessel, as the same manner as in the apparatus disclosed in the Patent Document 1.

Then, the window body causes a scarred portion, and a transmittance of the laser light at the scarred and damaged portion is disadvantageously lowered, so that not only an ablation operation cannot be efficiently performed, but also segments generated by the window body being ground are mixed in a product as contamination. As a result, there may be also posed a problem such that a purity of the nanoparticles as the product is disadvantageously lowered.

Furthermore, when the laser light is repeatedly irradiated to the scarred portion formed to the window body, cracks are liable to occur to the scarred portion, so that there may be a greater risk such that the window body is finally broken, and there is also a disadvantage such that it takes a lot of troubles and cost over the replacement of parts constituting the apparatus.

Further, as the same manner as in the apparatus disclosed in the Patent Document 1, the irradiating conditions of the laser light cannot be kept constant and the conditions are unstably changed, so that there may be also posed problems such that the laser light cannot be stably irradiated to the target for a long period of time, and the operation control for the laser ablation apparatus becomes to be complicated.

The present invention had been achieved for solving the problems inherent to the conventional prior arts, and an object of the present invention is to provide a liquid phase laser ablation method and a liquid phase laser ablation apparatus capable of performing the laser ablation continuously and stably and capable of stably generating atomized particles, due to structures such that even if the liquid rebounds, the rebounded liquid would not adhere to the optical components such as the focusing lens (collection lens), the reflecting lens, the window body of vessel or the like, and these optical components are configured so as not to contact the liquid.

Moreover, another object of the present invention is to provide a liquid phase laser ablation method and a liquid phase laser ablation apparatus for a case where the atomized particles are generated by irradiating a laser light to a target containing a component to be atomized, in which the laser ablation is continuously performed by stably irradiating the laser light to the target whereby the atomized particles are efficiently generated.

Solution to Problem

In order to achieve the above-mentioned object, the present invention provides a liquid phase laser ablation apparatus comprising: a vessel for storing liquid in which a component to be atomized is arranged; a laser oscillating device for oscillating a laser light irradiated to the component through the liquid; a reflecting mirror configured to freely change an angle of incidence of the laser light with respect to a surface of the liquid; a focusing lens for focusing the laser light oscillated from the laser oscillating device; a cover body for covering an upper surface of the vessel; and a laser light introduction port provided on the cover body or a side surface of the vessel above the surface of the liquid, Further, in the above-mentioned liquid phase laser ablation apparatus, it is preferable that the component to be atomized is arranged in the liquid as a target compact containing particles of the component to be atomized.

On the other hand, in the above-mentioned liquid phase laser ablation apparatus, it is also preferable that the component to be atomized is arranged as a slurry in which the particles of the component to be atomized are dispersed in the liquid.

That is, in the liquid phase laser ablation apparatus according to the present invention, the following two types of liquid phase laser ablation methods can be adopted in accordance with forms of arranging the component to be atomized in the liquid.

Namely, there can be employed one method comprising the steps of: preparing a target containing the component to be atomized; immersing the target into the liquid; irradiating a laser light to the target; and generating the atomized particles. Further, there can be also employed another method comprising the steps of: preparing a slurry (dispersion liquid) in which relatively large particles (particle size of sub-micron to several millimeters) of the component to be atomized are dispersed; irradiating a laser light to the dispersed particles in the slurry; and generating the atomized particles.

Since an upper surface of the vessel is covered with the cover body (lid), the liquid or the slurry rebounded by the irradiation of the laser light would not adhere to the focusing lens or the reflecting mirror, so that the laser ablation can be stably continued for a long period of time, and the nanoparticles can be generated efficiently.

Furthermore, in the above-mentioned liquid phase laser ablation apparatus, it is also preferable that the angle of incidence of the laser light with respect to the surface of the liquid is set to exceed 0 degree and less than 90 degrees. The incident angle of the laser light being to "exceed 0 degree and less than 90 degrees" has the same meaning as "exceed 90 degrees and less than 180 degrees" when expressed in terms of supplemental angle.

In this case, since the incident angle of the laser light with respect to the liquid surface becomes to an angle other than a perpendicular angle, "the liquid-rebounding phenomenon" in the same direction as in a direction introducing the laser light from a portion at which the laser light is incident does not occur, and there is no fear of defiling the circumference equipment installed close to an incident point.

Moreover, since the rebounded liquid would not adhere to the optical components such as a focusing lens and a reflecting mirror or the like, the absorption, scattering, reflection or the like of the laser light would not take place at all. In addition, a contamination by segments exfoliated from the optical components can be eliminated, and lowering in the purity of the product can be effectively prevented.

In addition, as for the incident angle of the laser light with respect to the surface of the above-mentioned liquid, it is more preferable that the incident angle is set to be 10 degrees or more and 80 degrees or less, and it is still more preferable that the incident angle is set to be 20 degrees or more and 70 degrees or less.

Moreover, since there is little contamination and damage to the optical components, the irradiation conditions of the laser light can be kept constant, and there can be obtained a remarkable effect such that the laser light can be stably irradiated for a long period of time, and the operation control for the laser ablation apparatus becomes easy.

Furthermore, in the above-mentioned liquid phase laser ablation apparatus, it is also preferable that a window body having a light transmitting property is fitted (inserted) into the laser light introduction port. In this case, even in a case where the vessel is configured to have an air-tight structure by fitting the window body into the laser light introduction port or by fitting the window body into an tip end portion of a laser light introduction pipe which is led out from the laser light introduction port, the liquid or the slurry rebounded by the irradiation of the laser light would not adhere to the window body. Therefore, the irradiating conditions of the laser light would not be changed, and it becomes possible to continuously perform the laser ablation in a stable state, and the finely atomized particles can be efficiently generated.

Moreover, when the above-mentioned window body is installed, the liquid and the generated nanoparticles may not contact the ambient air, an amount of impurities to be mixed into a product can be reduced sharply.

Furthermore, in the above-mentioned liquid phase laser ablation apparatus, it is also preferable that a laser light introduction pipe is drawn out at an attaching angle which is the same angle as the incident angle of the laser light with respect to the surface of the liquid. When the laser light introduction pipe is arranged in such the above manner, an introduction path of the laser light can be formed at the same angle as the incident angle of the laser light.

In addition, since the laser light introduction pipe is provided at the same attaching angle as the incident angle of the laser light, even in a case where the laser light is irradiated through the laser light introduction pipe, the adhesion by the above "rebounds of the liquid" would not arise in the laser light introduction pipe.

Furthermore, in the above-mentioned liquid phase laser ablation apparatus, it is also preferable that the window body having a light transmitting property is fitted into a tip end portion of the laser light introduction pipe. When this window body is provided, the liquid and the generated nanoparticles may not contact the ambient air, so that an impurity amount to be mixed in a product can be reduced.

Moreover, the present invention provides a liquid phase laser ablation method comprising the steps of: preparing a liquid in which a component to be atomized is arranged; irradiating a laser light to the liquid thereby to carry out ablation of the component to be atomized and generate atomized particles; wherein an angle of incidence of the laser light with respect to the surface of the liquid is set to exceed 0 degree and less than 90 degrees.

Furthermore, in the above-mentioned liquid phase laser ablation method, as the same manner as in the aforementioned ablation apparatus structure, the component to be atomized can be arranged in the liquid as a target compact containing the component to be atomized, or the component to be atomized can be arranged as a slurry in which the particles of the component to be atomized are dispersed in the liquid.

Effect of the Invention

According to the above liquid phase laser ablation apparatus and the method of the present invention, when the laser light is irradiated to the target arranged in the liquid and containing the component to be atomized or the laser light is irradiated to the slurry in which particles of the component to be atomized are dispersed, the laser light can be irradiated at an irradiation angle other than vertical angle.

In addition, since the upper surface of the vessel is covered with the cover body, the liquid or the slurry rebounded by the irradiation of the laser light would not adhere to the optical components such as the focusing lens, the reflecting mirror or the like. Accordingly, the absorption, scattering, reflection or the like of the laser light would not take place at all. In addition, a contamination caused by exfoliation of the optical components can be eliminated, and lowering in the purity of the product can be effectively prevented.

Moreover, since the liquid or the slurry rebounded by the irradiation of the laser light would not adhere to an optical system, the irradiating conditions of the laser light would not be varied or changed, and it becomes possible to continuously perform the laser ablation in a stable state, and the finely atomized particles can be efficiently generated.

DESCRIPTION OF EMBODIMENTS

Figure 1:
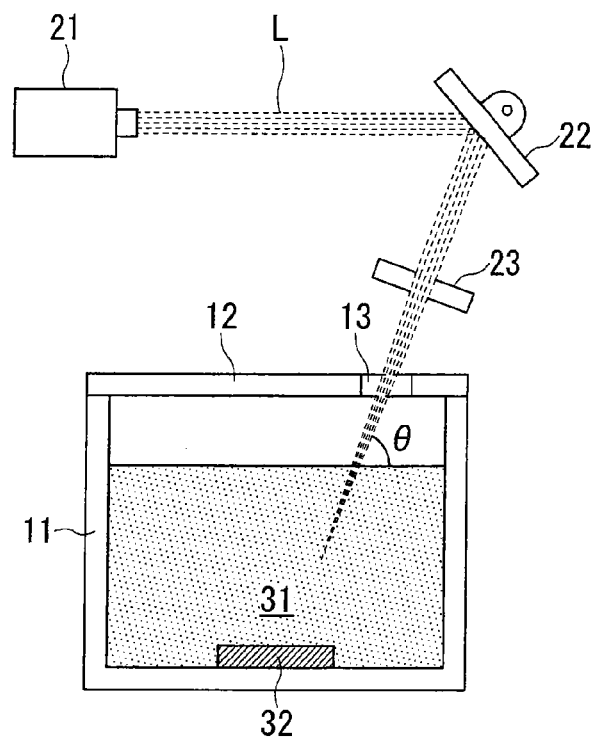
FIG. 1 It is a sectional view showing an entire structure of a liquid phase laser ablation apparatus according to one embodiment of the present invention.

FIG. 1 is a sectional view showing an entire structure of a liquid phase laser ablation apparatus according to one embodiment of the present invention. The present embodiment shows an example in which a target compact containing a component to be atomized is arranged in a liquid.

Namely, the liquid phase laser ablation apparatus according to the present embodiment is configured to comprise: a vessel 11 for storing liquid 31 in which a component to be atomized is arranged; a laser oscillating device 21 for oscillating a laser light L irradiated to the component through the liquid 31; a reflecting mirror 22 configured to freely change an angle θ of incidence of the laser light L with respect to a surface of the liquid 31; a focusing lens 23 for focusing the laser light L oscillated from the laser oscillating device 21; a cover body 12 for covering an upper surface of the vessel 11; and a laser light introduction port 13 provided on the cover body 12.

Moreover, the component to be atomized is arranged in the liquid 31 as a target compact 32 containing the component to be atomized.

The vessel 11 has an opening portion at an upper surface thereof, and has an approximately rectangular-shape in section. The opening portion of the vessel 11 is equipped with the plate-shaped cover body (lid) 12. A ring-shaped packing (illustration abbreviation) is interposed between the upper end surface of the vessel 11 and the peripheral portion of the cover body 12, thereby to form a structure in which both the cover body 12 and the vessel 11 are closely contact to each other.

A part of the cover body 12 is opened, and constitutes the laser light introduction port 13. Although FIG. 1 shows that the laser light introduction port 13 is opened at a portion of the cover body 12, the laser light introduction port 13 may be also formed at a side portion of the vessel 11 and the side portion is upwardly apart from a surface of the liquid.

An optical system consists of the laser oscillation device 21 which oscillates the laser light L, the reflecting mirror 22 for reflecting the laser light L, and the focusing lens 23 which focuses the laser light L. Although a wavelength of the laser light is not particularly limited, there can be suitably used, for example, a fundamental wave (wavelength: 1064 nm), a $2^{nd}$ harmonic wave (wavelength: 532 nm), a $3^{rd}$ harmonic wave (wavelength: 355 nm) and a $4^{th}$ harmonic wave (wavelength: 266 nm) of the Nd:YAG laser which oscillates pulsed laser irradiation. As another example of other irradiation conditions, an output: 100 mJ/pulse, a pulse frequency: 10 pulse/sec are also suitable.

The liquid 31 is stored in the vessel 11 and the target is immersed into the liquid 31. A material for constituting the vessel 11 and the cover body 12 is not particularly limited. However, a synthetic resin such as polypropylene or the like can be used. Further, glass may also be sufficiently used as the material.

Although the liquid 31 having a high transparency (translucency) is preferable as for the liquid 31, the liquid is not particularly limited. For example, ethanol, methanol, isopropanol, toluene, xylene, acetone, water, or the like can be suitably used.

The laser light L which is focused by the focusing lens 23 is configured so as to be irradiated to a surface of the target 32 arranged in the liquid 31 at almost a focal point position of the laser light L.

In this connection, in the liquid phase laser ablation apparatus shown in FIG. 1, although the target 32 is horizontally positioned on a bottom surface of the vessel 11, the target 32 may also be obliquely arranged so that the irradiated laser light L is perpendicularly irradiated to a plane surface of the target 32 from an almost vertical direction with respect to the plane surface of the target 32.

Moreover, in order to avoid that the laser light L is repeatedly irradiated to a specified surface portion of the target 32 and only the specified surface portion of the target 32 is subjected to the ablation, it is more preferable to configure the ablation apparatus so that the laser light L is irradiated to an entire surface of the target 32. Concretely, the vessel 11 per se including the target 32 is horizontally moved from front to back and from side to side utilizing a well-known driving method and moving mechanism, or only the target 32 is horizontally moved from front to back and from side to side, or only the target is eccentrically rotated utilizing well-known various driving equipments.

In the liquid phase laser ablation apparatus according to the above embodiment, the laser light L oscillated from the laser oscillation device 21 is reflected in a predetermined angle direction by the reflecting mirror 22 of which a reflecting surface is freely rotatable. An incident angle θ of the reflected laser light L with respect to the surface of the liquid 31 is set to an angle exceeding 0 degree and less than 90 degrees, and more preferably set to an angle of 10 degrees or more and 80 degrees or less.

Then, the reflected laser light L is further focused by the focusing lens 23. The focused laser light L passes through the laser light introduction port 13 and is irradiated to the target 32 arranged at a bottom portion of the liquid 31. At this time, the component to be atomized, which is contained in the target 32, is subjected to the ablation by the laser light, thereby to generate nanoparticles having a fine particle diameter.

According to the liquid phase laser ablation apparatus of the above-mentioned embodiment, the incident angle θ of the laser light L with respect to the surface of the liquid is set to the angle exceeding 0 degree and less than 90 degrees, and the incident angle would not take a verticality but takes an angle other than right angle, so that there are few possibilities of causing the "liquid-rebounding phenomenon" in which the liquid is rebounded from an incident portion of the laser light at liquid surface to a direction which is the same direction as the laser light introduction direction, whereby there is no fear of circumferential parts positioned close to the incident point of the laser light being contaminated and damaged.

In addition, since the rebounded liquid 31 would not adhere to the optical components such as the focusing lens 23 and the reflecting mirror 22 or the like, so that the absorption, scattering and reflection of the laser light L would not take place. Moreover the contamination caused by the segments exfoliated from the optical components is eliminated, so that the lowering in purity of a product can be effectively prevented.

Moreover, since there is little contamination or damage to the optical components, the conditions for irradiating the laser light become constant, and the laser light can be stably irradiated for a long period of time, so that there can be obtained an effect such that an operational control of the ablation apparatus can become easy.

Figure 2:
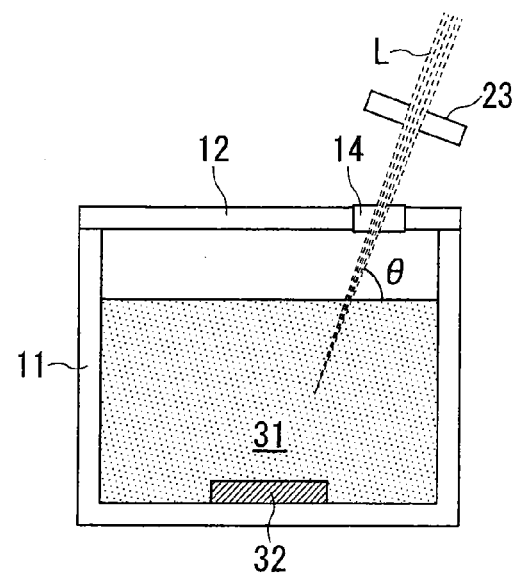
FIG. 2 It is a sectional view showing an essential structure of a liquid phase laser ablation apparatus according to another embodiment of the present invention.

FIG. 2 is a sectional view showing an essential portion of a liquid phase laser ablation apparatus according to another embodiment of the present invention. This liquid phase laser ablation apparatus is configured to have the same structure as the embodiment shown in FIG. 1 except in a point that a window body 14 having a high translucency is fitted into the laser light introduction port 13.

In order to prevent a loss caused by the reflection of the laser light L, the above-mentioned window body 14 is composed of a circular-plate shaped silica glass (quartz glass) having a high transparency (translucency), and the window body 14 is formed with antireflection coating.

When the above-mentioned window body 14 is fitted and arranged into the laser light introduction port 13 and a function of the cover body 12 is also utilized, an inner space of the vessel 11 can be made to have an almost air-tightly closed state. Therefore, the liquid 31 and the generated nanoparticles do not contact ambient air, so that an amount of impurities to be mixed into a product can be reduced.

In this connection, whether the vessel 11 is configured to form a closed system or an open system is appropriately selected in accordance with physical properties etc. of the liquid 31 and the component to be atomized, which constitutes the target 32. Further, in a case where the vessel 11 is configured to form the closed system, the closed system can be also substantially formed by a well-known method in which the air contained in the vessel 11 and the liquid 31 retained in the vessel 11 is replaced with inert gas or nitrogen gas whereby an inside of the vessel 11 is interrupted from an ambient air (open air).

Figure 3:
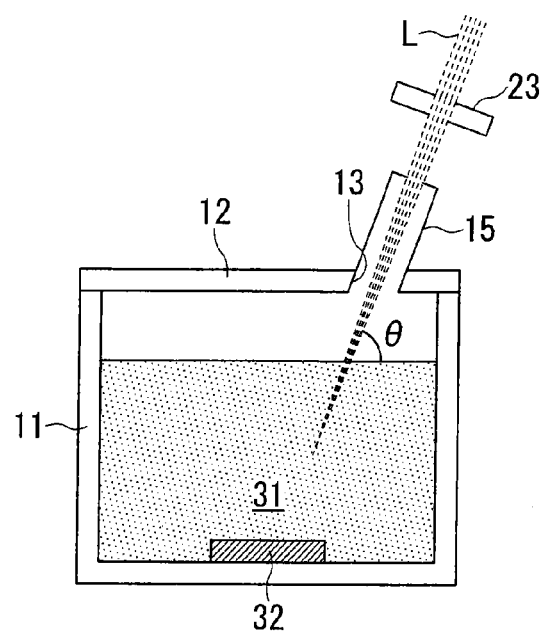
FIG. 3 It is a sectional view showing an essential structure of a liquid phase laser ablation apparatus according to still another embodiment of the present invention.

FIG. 3 is a cross sectional view showing an essential portion of a liquid phase laser ablation apparatus according to another embodiment of the present invention. This liquid phase laser ablation apparatus is configured to have the same structure as the embodiment shown in FIG. 1 except in a point that a cylindrical laser light introduction pipe 15 is drawn out from the laser light introduction port formed to the cover body 12, at an attaching angle which is the same angle θ as the incident angle of the laser light L with respect to the surface of the liquid 11.

Thus, when the laser light introduction pipe 15 is arranged, a path for introducing the laser light can be formed at the same angle as the incident angle of the laser light. Further, since the laser light introduction pipe 15 is formed at the same attaching angle as the incident angle θ of the laser light, even in a case where the laser light L is irradiated through the laser light introduction pipe 15, an adhesion due to the above "rebounding of the liquid" would not arise inside the laser light introduction pipe 15.

Figure 4:
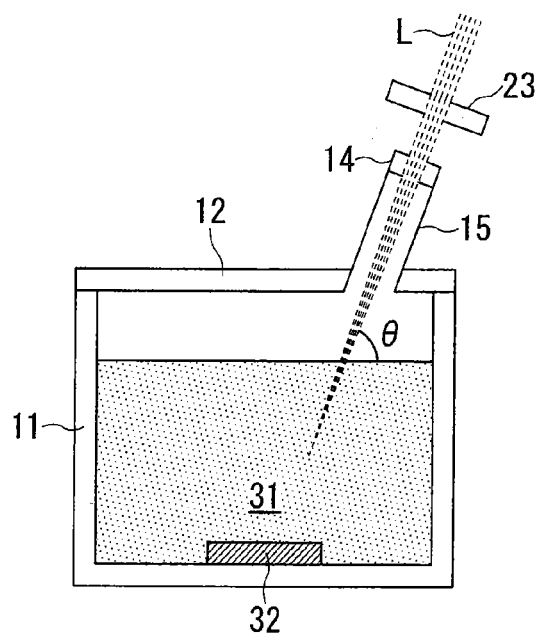
FIG. 4 It is a sectional view showing an essential structure of a liquid phase laser ablation apparatus according to yet another embodiment of the present invention.

FIG. 4 is a sectional view showing an essential structure of a liquid phase laser ablation apparatus according to yet another embodiment of the present invention. This liquid phase laser ablation apparatus is configured to have the same structure as the embodiment shown in FIG. 3 except in a point that a window body 14 having a light transmittance is fitted into another end portion (tip end side) of the laser light introduction pipe 15. In this connection, a material for constituting the laser light introduction pipe 15 is the same as that of the afore-mentioned vessel 11.

When this window body 14 is fitted and arranged into the laser light introduction pipe 15, the liquid and the generated nanoparticles do not contact the ambient air, so that the amount of impurities to be mixed into the product can be reduced. In addition, the scattered liquid and the splashed slurry would not adhere to the window body 14, so that the irradiating conditions of the laser light can be maintained constant.

Figure 5:
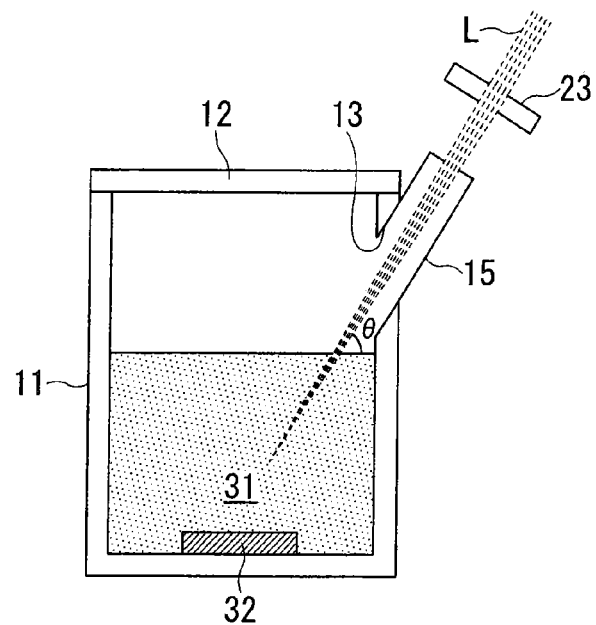
FIG. 5 It is a sectional view showing an essential structure of a liquid phase laser ablation apparatus according to other embodiment of the present invention.

FIG. 5 is a sectional view showing an essential structure of a liquid phase laser ablation apparatus according to yet another embodiment of the present invention. This liquid phase laser ablation apparatus is configured to have the same structure as the embodiment shown in FIG. 3 except in a point that the laser light introduction port 13 is provided to a side surface of the vessel 11, and is provided to an upper portion from a surface of the liquid 31, and the laser light introduction pipe 15 is drawn out from this laser light introduction port 13. Furthermore, the cylindrical laser light introduction pipe 15 is formed at the same attaching angle as the incident angle θ of the laser light L.

Figure 7:
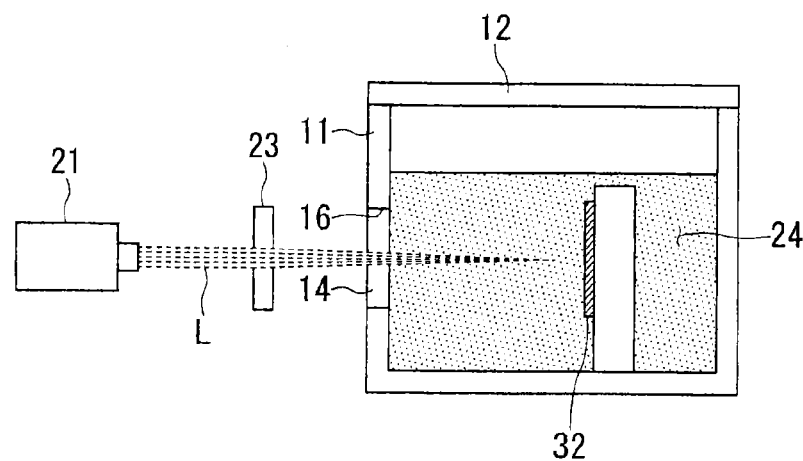
FIG. 7 It is a sectional view showing an entire structure of a conventional liquid phase laser ablation apparatus.

In this embodiment, the laser light introduction port 13 is provided to the side surface of the vessel 11 and is provided to the upper portion apart from the surface of the liquid 31, and one end of the cylindrical laser light introduction pipe 15 is connected to the laser light introduction port 13, and the pipe 15 is extended obliquely upward, so that the laser light introduction pipe 15 would not contact the liquid 31. Therefore, the laser light would not damage the window body unlike the window body 14 immerged in the liquid 24 as shown in FIG. 7.

Figure 6:
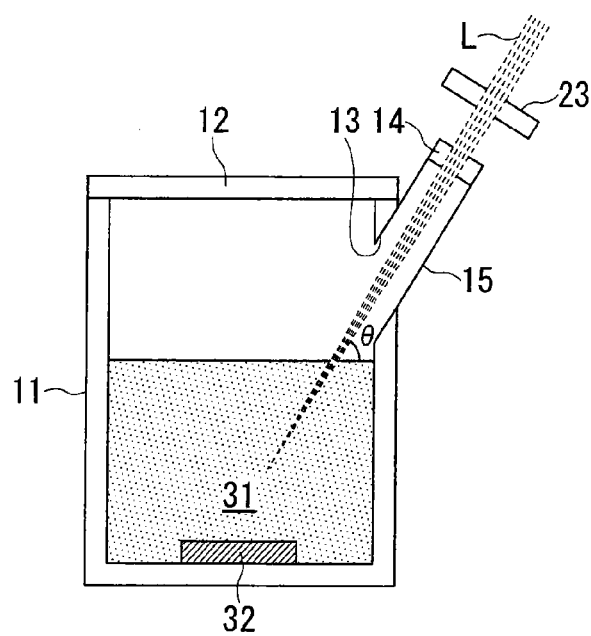
FIG. 6 It is a sectional view showing an essential structure of a liquid phase laser ablation apparatus according to other embodiment of the present invention.

FIG. 6 is a sectional view showing an essential structure of a liquid phase laser ablation apparatus according to yet another embodiment of the present invention. This liquid phase laser ablation apparatus is configured to have the same structure as the embodiment shown in FIG. 5 except in a point that an window body 14 having a light transmittance is fitted and arranged into another end portion (upper end portion) of the laser light introduction pipe 15.

When this window body 14 is fitted and arranged into the laser light introduction pipe 15, the liquid 31 and the generated nanoparticles do not contact the ambient air, so that the amount of impurities to be mixed into the product can be reduced. In addition, the rebounded (scattered) liquid 31 and the splashed slurry would not adhere to the window body 14, so that the irradiating conditions of the laser light can be maintained constant.

Next, although illustration is not carried out, another embodiment using a slurry will be explained hereunder. In this embodiment, the slurry in which particles of the component to be atomized are dispersed is used in place of the afore-mentioned target 32.

This liquid phase laser ablation apparatus is configured, for example, so as to comprise: a vessel for holding the slurry in which the particles of the component to be atomized are dispersed; a laser oscillation device for oscillating the laser light to irradiate the particles contained in this slurry with laser light; a focusing lens for focusing the laser light oscillated from the laser oscillation device; a reflecting mirror configured to freely change an angle of incidence of the laser light with respect to a surface of the afore-mentioned slurry; a cover body for covering an upper surface of the vessel; and a laser light introduction port provided on the cover body or a side surface of the vessel.

Further, the incident angle of the laser light with respect to a surface of the slurry is set to a value exceeding 0 (zero) and less than 90 degrees, more preferably set to a value of 10 degrees or more and 80 degrees or less.

Moreover, in a case where the above liquid phase laser ablation apparatus is used and the laser light is irradiated to the slurry in which the particles of the component to be atomized are dispersed, it is effective to configure the apparatus so that the particles contained in the liquid are uniformly irradiated by the laser light.

Concretely, agitators or stirrers having various shapes attached to rotation shafts are prepared, and the agitator or the like is installed into the slurry stored in the vessel whereby the slurry is agitated by the agitator or the like.

As another countermeasure, it is also effective to stir the slurry by means of a magnetic stirrer in which a stirrer (rod-shaped magnet) of which surface is subjected to surface coating of Teflon (registered trademark) or the like is enclosed in the vessel, and a rotating magnetic field is applied to the stirrer from outside of the vessel 11 whereby a rotation power is transmitted to the stirrer.

As described above, also in case of this embodiment using the slurry in which the particles of the component to be atomized are dispersed, the following advantageous effects can be obtained as the same manner as the previous embodiment using the target.

That is, the incident angle of the laser light with respect to the surface of the slurry is set to the angle exceeding 0 degree and less than 90 degrees, and the incident angle would not take a verticality but takes an angle other than right angle, so that there are few possibilities of causing the "liquid-rebounding phenomenon" in which the slurry is rebounded from an incident portion of the laser light at slurry surface to a direction which is the same direction as the laser light introduction direction, whereby there is no fear of circumferential parts being contaminated and damaged.

In addition, since the rebounded liquid 31 (slurry) would not adhere to the optical components, so that the absorption, scattering and reflection of the laser light L would not take place. Moreover the contamination caused by the segments exfoliated from the optical components is eliminated, so that the lowering in purity of a product can be effectively prevented.

Moreover, since there is little contamination or damage to the optical components, the conditions for irradiating the laser light become constant, and the laser light can be stably irradiated for a long period of time, so that there can be obtained an effect such that an operational control of the ablation apparatus can become easy.

Next, the following comparative experiments were conducted using the liquid phase laser ablation apparatuses according to concrete Examples and Comparative Examples. Specifications and operating conditions of parts commonly used in both Examples and Comparative Examples are as follows.

(1) As the vessel, a box-shaped glass vessel having inner dimensions of 50 mm length, 75 mm wide and 52 mm depth with an internal volume of 200 cm$^3$, and an effective internal volume of 160 cm$^3$ for injecting the liquid or slurry was used.
(2) A pure water was used as the liquid to be filled up in the vessel.
(3) Gold (Au) was used as the target.
(4) As the laser oscillation device, there was used a Nd:YAG laser oscillation device for oscillating a laser light having a wavelength of 266 nm in ultraviolet light range, of which the output power was 100 mJ/pulse and the pulse frequency was 10 pulses/sec (PPS).

Figure 8:
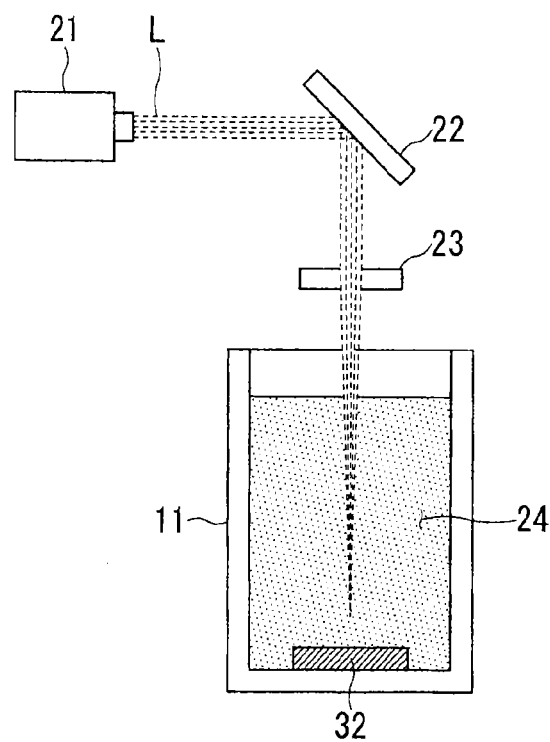
FIG. 8 It is a sectional view showing an entire structure of another conventional liquid phase laser ablation apparatus.

Firstly, as a Comparative Example, an ablation operation was carried out by using the conventional liquid phase laser ablation apparatus shown in FIG. 8. In this case, an incident angle of the laser light L was fixed so that the laser light L might enter perpendicularly to the surface of the liquid 24.

On the other hand, liquid phase laser ablation apparatuses according to Examples shown in FIG. 1 were produced by modifying the optical system of the conventional liquid phase laser ablation apparatus shown in FIG. 8. Namely, the reflecting mirror 22 was appropriately rotated so that the incident angle δ of the laser light L with respect to the liquid surface of the liquid (pure water) 31 filled up in the vessel was varied within a range of 30 to 60 degrees, and each of the incident angle of the laser light L was fixed.

Then, when the above liquid phase laser ablation apparatuses according to Examples and Comparative Example were continuously operated under the same conditions, deterioration (variation with time) of the irradiating condition of the laser light and an amount of generated nanoparticles were measured and compared.

In this regard, the deterioration of the irradiating condition was measured as a time range from an initial state to a time when the irradiating condition of the laser light was varied (deteriorated) at 5% or more because the liquid or the slurry was rebounded by the irradiation of the laser light and the rebounded liquid or the slurry was adhered to the optical system such the focusing lens or the like.

The amount of the generated nanoparticles was measured as an amount of nanoparticles which can be manufactured in one continuous operation of the laser ablation apparatus.

As a result, in each of the apparatuses of Examples, the liquid or slurry rebounded by the irradiation of the laser light did not adhere to the optical components such as the focusing lens or the like.

Therefore, in each of the apparatuses of Examples, 5% or more of variation in the irradiating condition of the laser light was not observed at all even if the irradiation was continued for 5 hours or longer. In contrast, in a case where the comparative apparatuses were used, a time until the irradiating condition of the laser light was changed by 5% or more was about 5 minutes.

In addition, a weight of the nanoparticles capable of being manufactured in one continuous operation could be increased by 5 to 7 times as compared with a case where the apparatus of comparative example was used, and it was confirmed that the manufacturing efficiency of the nanoparticles could be remarkably improved.

As explained above, in each of the embodiments, the fundamental structure of the present invention is to adjust the incident angle of the laser light so that the liquid or slurry rebounded by the laser light irradiation to the liquid or slurry may not adhere to the optical components such as the focusing lens, the reflecting mirror, the window body.

That is, an essential requirement for the present invention is that at least the laser light is irradiated to the liquid surface at an incident angle other than vertical angle (right angle). In this regard, although the incident angle becomes different in accordance with a type of embodiment, if the degree of incident angle of the laser light to with respect to the liquid surface is indicated by "θ", the θ can be arbitrarily selected from a range specified by a relation formula:

$$0<\theta<90° \text{ or } 90°<\theta<180°.$$

Moreover, the incident angle of the laser light with respect to the liquid surface may appropriately change during the operation of the laser ablation.

INDUSTRIAL APPLICABILITY

According to the liquid-phase laser ablation apparatus and the liquid-phase laser ablation method of the present invention, when the laser light is irradiated to the target arranged in the liquid and the target containing the component to be atomized, or the slurry in which the particles of the component to be atomized are dispersed, the laser light can be irradiated to the liquid at an incident angle other than vertical angle (right angle).

In addition, also the upper surface of the vessel is covered with the cover body (lid), the liquid or the slurry rebounded by the irradiation of the laser light would not adhere to the optical components such as the focusing lens or the reflecting mirror. Therefore, the absorption, scattering, reflection or the like of the laser light would not take place at all. In addition, a contamination by segments exfoliated from the optical components can be eliminated.

Moreover, since the liquid or the slurry rebounded by the irradiation of the laser light would not adhere to an optical system, the irradiating conditions of the laser light would not be varied or changed, and it becomes possible to continuously perform the laser ablation in a stable state, and the finely atomized particles can be efficiently generated.

REFERENCE SIGNS LIST

11 . . . vessel (cell), 12 . . . upper cover (cover body, lid), 13 . . . laser light introduction port, 14 . . . window body (laser light introduction window), 15 . . . laser light introduction pipe, 16 . . . penetration hole, 21 . . . laser oscillation device, 22 . . . reflecting mirror, 23 . . . focusing lens (collecting lens), 24 . . . liquid, 31 . . . liquid (or slurry in which particles are dispersed), 32 . . . target, L—laser light.

The invention claimed is:
1. A liquid phase laser ablation apparatus comprising:
a vessel having an interior storing liquid and a component to be atomized, the component to be atomized being arranged in the liquid;
a laser oscillating device configured to oscillate a laser light and to irradiate the component through the liquid;
a reflecting mirror configured to freely change an angle of incidence of the oscillated laser light with respect to an upper surface of the liquid;
a focusing lens configured to focus the oscillated laser light;

a cover body configured to cover an upper surface of the vessel; and a laser light introduction pipe extending above the upper vessel surface at the angle of incidence and opening into the vessel interior at a laser light introduction port provided above the upper liquid surface on either the cover body or on a side surface of the vessel distinct from the upper vessel surface, wherein said angle of incidence of the laser light with respect to the surface of the liquid is set to a predetermined angle exceeding 0 degrees and which is less than 80 degrees.

2. The liquid phase laser ablation apparatus according to claim 1, wherein said component to be atomized is arranged in the liquid as a target compact containing the component to be atomized.

3. The liquid phase laser ablation apparatus according to claim 1, wherein said component to be atomized is arranged as a slurry in which particles of the component to be atomized are dispersed in the liquid.

4. The liquid phase laser ablation apparatus according to claim 1, wherein a window body having a light transmitting property is fitted to the laser light introduction port.

5. The liquid phase laser ablation apparatus according to claim 1, wherein said angle of incidence is 10 degrees or more and 80 degrees or less.

6. The liquid phase laser ablation apparatus according to claim 1, wherein said angle of incidence is 20 degrees or more and 70 degrees or less.

7. The liquid phase laser ablation apparatus according to claim 1, wherein the liquid is selected from ethanol, methanol, iso-propanol, toluene, xylene, acetone, or water.

8. A liquid phase laser ablation method comprising:

preparing the liquid phase laser ablation apparatus according to claim 1;

preparing the liquid storing the component to be atomized; and irradiating the laser light into the liquid at the angle of incidence so as to ablate the component and generate atomized particles of the component.

9. The liquid phase laser ablation method according to claim 8, wherein said component to be atomized is arranged in the liquid as a target compact containing the component to be atomized.

10. The liquid phase laser ablation method according to claim 8, wherein said component to be atomized is arranged as a slurry in which particles of the component to be atomized are dispersed in the liquid.

11. The liquid phase laser ablation method according to claim 8, wherein said angle of incidence is 10 degrees or more and 80 degrees or less.

12. The liquid phase laser ablation method according to claim 8, wherein said angle of incidence is 20 degrees or more and 70 degrees or less.

13. The liquid phase laser ablation method according to claim 8, wherein the liquid is selected from ethanol, methanol, iso-propanol, toluene, xylene, acetone, or water.

* * * * *